United States Patent [19]
Morin

[11] Patent Number: 4,539,116
[45] Date of Patent: Sep. 3, 1985

[54] PAINT FILTER

[76] Inventor: Rolland L. Morin, 5550 Carleton Rockwood Rd., South Rockwood, Mich. 48179

[21] Appl. No.: 523,110

[22] Filed: Aug. 15, 1983

[51] Int. Cl.³ .............................................. B01D 29/10
[52] U.S. Cl. .................................... 210/445; 210/450; 210/451; 210/454; 118/610
[58] Field of Search .............. 210/232, 445, 450, 451, 210/452, 453, 454; 55/373; 118/603, 610

[56] References Cited

U.S. PATENT DOCUMENTS

| | | | |
|---|---|---|---|
| 3,154,487 | 10/1964 | Thornton et al. | 210/323 |
| 3,272,337 | 9/1966 | Elwell | 210/136 |
| 3,327,858 | 6/1967 | Eddy et al. | 210/234 |
| 3,640,392 | 2/1972 | Smith et al. | 210/445 |
| 3,771,664 | 11/1973 | Schrink et al. | 210/445 |
| 3,774,769 | 11/1973 | Smith | 210/445 |
| 3,814,261 | 6/1974 | Morgan, Jr. | 210/453 |
| 3,909,414 | 9/1975 | Drath | 210/454 |
| 3,959,137 | 5/1976 | Kirsgalvis | 210/232 |
| 4,157,964 | 6/1979 | Rishel | 55/373 |
| 4,204,966 | 5/1980 | Morgan, Jr. | 210/455 |
| 4,283,281 | 8/1981 | Cogan | 210/453 |
| 4,285,814 | 8/1981 | Morgan, Jr. | 210/453 |
| 4,419,240 | 12/1983 | Rosaen | 210/450 |

Primary Examiner—Richard V. Fisher
Assistant Examiner—Wanda L. Millard
Attorney, Agent, or Firm—Gifford, VanOphem, Sheridan, Sprinkle & Nabozny

[57] ABSTRACT

An in line filter assembly is provided for use in conjunction with a painting system having a pressurized source of liquid paint, a paint applicator and a fluid line which fluidly connects the pressurized paint source and applicator together. The filter assembly comprises an elongated housing defining an elongated housing chamber. One end of the housing chamber is connected in series with the pressurized paint source while the opposite end of the housing chamber is fluidly connected to the applicator so that paint flowing from the source and to the applicator passes through the housing chamber. A tubular and cylindrical filter element open at one end is removably inserted into the housing chamber so that paint flow through the housing chamber flows through the filter element which removes any solid contaminants contained in the paint.

3 Claims, 3 Drawing Figures

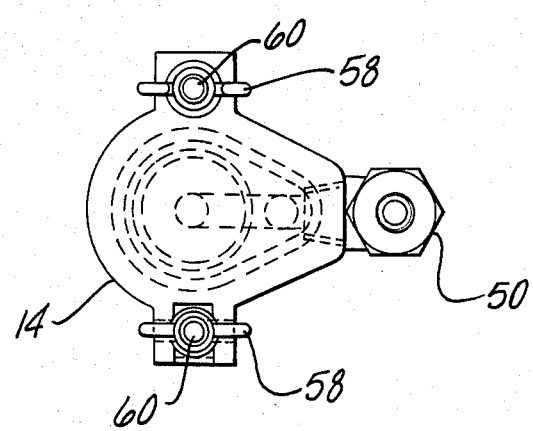
Fig-1
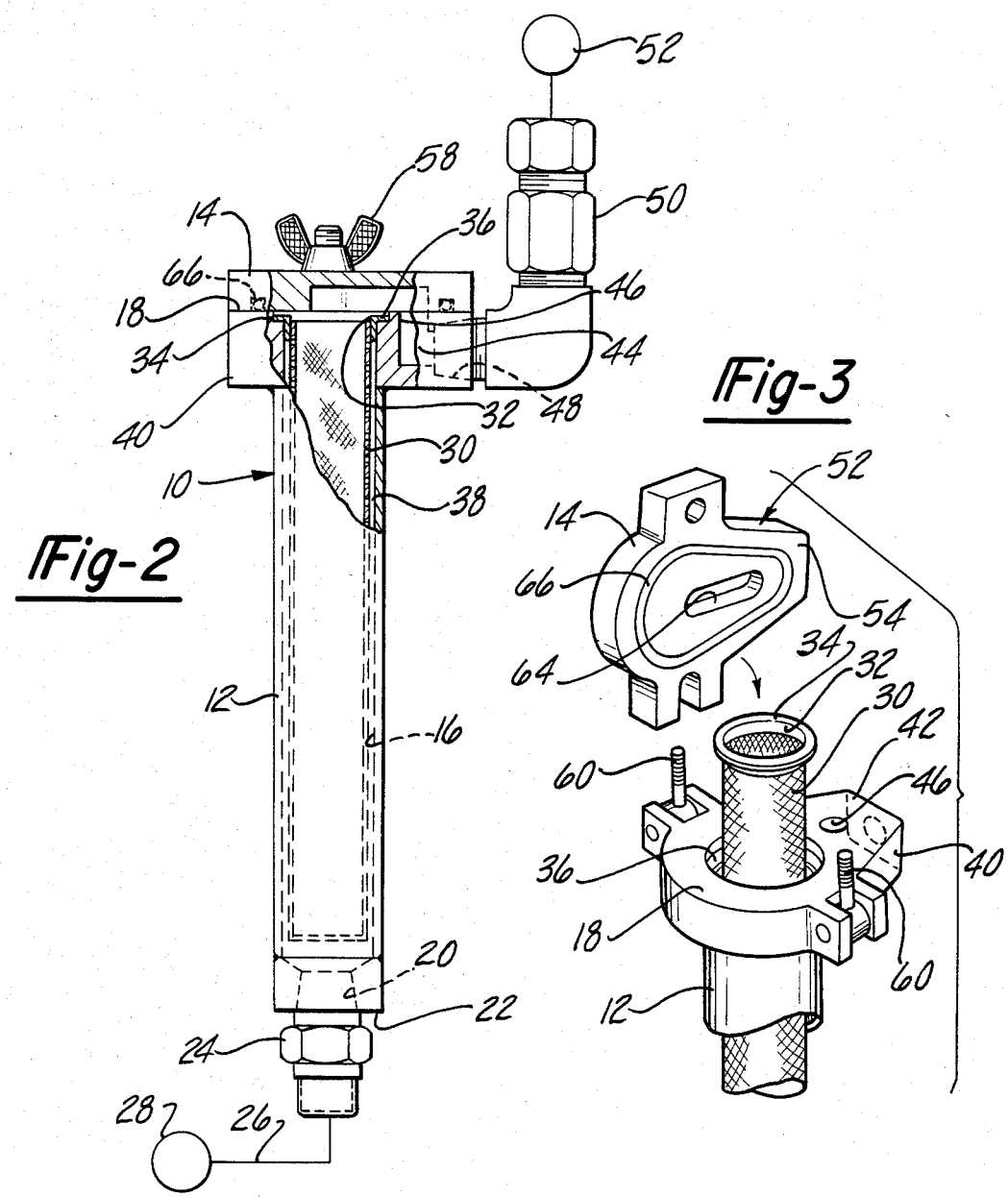
Fig-3
Fig-2

PAINT FILTER

BACKGROUND OF THE INVENTION

I. Field of the Invention

The present invention relates generally to fluid filters and, more particularly, to a liquid filter for a painting system.

II. Description of the Prior Art

In industrial painting systems, the liquid paint flows from a pressurized paint source or paint pump, through a fluid line and to the paint applicator, typically a paint spray gun. In order to prevent any solid contaminants contained within the paint from reaching the spray gun and blemishing the paint job, it is necessary to filter the paint and thus remove any contaminants contained therein.

The previously known industrial paint filters are typically positioned within the source of paint at the pump station and filter the paint at the outlet of the paint pump. While these previously known paint filters are effective in use, they typically are a long distance from the point of application. In as much as the paint does become contaminated with foreign elements in this long distance, foreign particles become embedded in the finish product which is expensive to repair.

SUMMARY OF THE PRESENT INVENTION

The present invention provides a paint filter which overcomes the above-mentioned disadvantages of the previously known devices by being installed very close to the point of paint application.

In brief, the paint filter of the present invention comprises an elongated housing defining an elongated housing chamber. One end of the housing is fluidly connected to the pressurized paint source or pump outlet while the other end of the housing is fluidly connected to the paint applicator. Consequently, the housing chamber is connected in series with the fluid line between the paint pump and paint applicator so that all paint from the pump and to the applicator flows through the housing chamber.

An elongated tubular and cylindrical filter element open at one end is removably insertable into the housing chamber and the open end of the filter element sealingly engages the housing. The filter element is thus fluidly positioned in between the ends of the housing so that paint flow through the housing chamber also flows through the filter element.

In operation, the filter element removes any solid contaminants contained within the paint during operation of the painting system. When the filter becomes partially clogged after usage, the paint filter is easily removed from the housing and either cleaned or replaced with a clean filter whereupon operation of the painting system can resume. Since the painting filter of the present invention is connected in series with the fluid line between the paint pump and applicator, removal of the filter element from the housing does not return any removed contaminants to the supply of paint.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a top plane view illustrating a preferred embodiment of the present invention;

FIG. 2 is a partial longitudinal sectional view illustrating the preferred embodiment of the invention; and FIG. 3 is an exploded fragmentary view illustrating the preferred embodiment of the invention.

DETAILED DESCRIPTION OF A PREFERRED EMBODIMENT OF THE PRESENT INVENTION

With reference first to FIGS. 1 and 2, a preferred embodiment of the present invention is thereshown and comprises an elongated housing 10. The housing 10 further includes an elongated tubular and cylindrical main body 12 and a cap 14 detachably secured to the body 10 in a fashion to be subsequently described. The housing body 12 thus forms an elongated cylindrical chamber 16 open at its upper end to one end 18 of the housing body 12 and at its other end to a fluid port 20 formed in the lower end 22 of the body 12. The port 20 is connected by conventional fluid fitting 24 and fluid line 26 to a paint applicator 28, such as a spray gun.

Referring now particularly to FIGS. 2 and 3, an elongated tubular and cylindrical filter element 30 open at one end 32 is removably insertable into the housing chamber 16 and to a filtering position shown in FIG. 2. In its filtering position, an outwardly extending and annular flange 34 secured to the filter element around its open end 32 abuts against an annular abutment surface 36 formed in the upper end 18 of the body 12. In addition, the filter element 30 has a smaller diameter than the diameter of the housing chamber 16 so that the filter 30 is positioned inwardly from the walls of the housing chamber 16 thus forming an annular chamber 38 (FIG. 2) therebetween. This annular chamber 38 is open to the housing port 20.

Still referring to FIGS. 2 and 3, the housing includes an enlarged mating member 40 secured to and forming a part of the housing body 12. The mating member 40 forms a generally planar mating surface 42 at the upper end 18 of the body 12. In addition, a fluid passageway 44 is formed through the mating member 40. One end 46 of the fluid passageway 44 is open to the mating surface 42 while its other end 48 terminates in a fluid port at one side of the member 40. This fluid port 48 is connected by fluid fittings 50 to a pressurized paint source 52, such as the pump outlet of a painting system.

With reference now to FIGS. 1–3, the cap 14 includes a generally planar surface 54 dimensioned to cover and substantially flatly abut against the mating surface 42 on the member 40. The cap 14 is secured in place by nuts 58 which threadably engage fasteners 60 on the member 40 so that, upon tightening of the nuts 58, the cap 14 is firmly, but detachably, secured to the body 12. In doing so, the mounting flange 34 on the filter element 30 is sandwiched in between the cap 14 and member 40 thus sealing the open end 32 of the filter element 30 to the housing 10.

With reference again particularly to FIGS. 2 and 3, an elongated channel 64 is formed in the cap 14 and extends between the end 46 of the passageway 44 and the open end 32 of the filter element 30 so that fluid flow through the passageway 44 flows into the interior of the filter element 30. A fluid seal 66 is positioned within a groove in the cap 14 which encircles the channel 64 and fluidly seals the cap 14 and body 12 together.

In operation, the cap 14 is first removed from the body 12 as shown in FIG. 3 and the filter element 30 is inserted into the housing chamber 16 and to the position shown in FIG. 2. The cap 14 is then secured to the upper end 18 of the body 12 by the nuts 58. In doing so, the filter element 30 is fluidly positioned in series with the fluid line from the paint source 52 and to the applicator 28.

Upon activation of the fluid pressure source 52, paint flows through the passageway 44, channel 64 and into the interior of the filter element 30. From the interior of the filter element 30, the paint flows outwardly through the filter element 30 whereupon any solid contaminants contained within the paint are removed by the filter element 30. After flowing through the filter element 30, the paint passes out through the filter port 20 at the lower end 22 of the body 12 and to the applicator 28 in the desired fashion.

When the filter 30 becomes partially clogged due to the removal of the contaminants from the paint, the paint source 52 is disconnected from the housing 10 in any conventional fashion, such as a valve. The cap 14 is then removed, as shown in FIG. 3, and the filter element 30 is either removed and replaced with a clean filter element or removed, cleaned and then reinserted into the housing chamber 16. The cap 14 is then resecured to the housing body 12 and the operation of the painting system can resume.

From the foregoing, it can be seen that the present invention provides a simple, inexpensive and yet highly effective line filter for a painting system which enables the painting filter to be rapidly, easily and inexpensively replaced or cleaned as required.

Having described my invention, however, many modifications thereto will become apparent to those skilled in the art to which it pertains without deviation from the spirit of the invention as defined by the scope of the appended claims.

I claim:

1. A painting system comprising
    means for supplying pressurized liquid paint,
    a paint applicator,
    a fluid line which fluidly connects the means supplying pressurized paint to the applicator,
    a filter assembly comprising
        an elongated housing defining an elongated housing chamber,
        an elongated tubular filter element open at one end, said filter element being removably insertable into said housing chamber,
    means for sealing the open end of said filter element to said housing,
    means for fluidly connecting said housing chamber in line between said means supplying paint and said applicator so that one end of said housing chamber is open to said means supplying pressurized paint and so that the other end of said housing chamber is open to said paint applicator, said filter element being positioned fluidly between said ends of said housing chamber;
    wherein said filter element includes an outwardly extending flange adjacent its open end, said housing comprising an elongated body and a cap removably secured to and enclosing said one end of said body, and said flange being sandwiched between said body and said cap; and
    said assembly further comprising a fluid passageway formed in said body and open at one end to said one end of said body, and a channel formed in said cap, said channel extending between said one end of said passageway and said open end of said filter element.

2. The invention as defined in claim 1 wherein said filter element is spaced inwardly from said housing thus forming an annular chamber in said housing chamber between said filter element and said housing.

3. The invention as defined in claim 1 wherein said cap comprises a closed groove encircling said channel and comprising a fluid seal positioned in said groove.

* * * * *